(12) United States Patent
Dexter

(10) Patent No.: US 11,485,305 B2
(45) Date of Patent: Nov. 1, 2022

(54) HOSE PLOW ATTACHMENT

(71) Applicant: Timothy P. Dexter, Newburgh, NY (US)

(72) Inventor: Timothy P. Dexter, Newburgh, NY (US)

( * ) Notice: Subject to any disclaimer, the term of this patent is extended or adjusted under 35 U.S.C. 154(b) by 127 days.

(21) Appl. No.: 17/094,033

(22) Filed: Nov. 10, 2020

(65) Prior Publication Data

US 2021/0155183 A1    May 27, 2021

Related U.S. Application Data

(60) Provisional application No. 62/939,028, filed on Nov. 22, 2019.

(51) Int. Cl.
*B60R 19/54* (2006.01)
*A62C 33/00* (2006.01)

(52) U.S. Cl.
CPC ............. *B60R 19/54* (2013.01); *A62C 33/00* (2013.01)

(58) Field of Classification Search
CPC ................................ B60R 19/54; A62C 33/00
USPC .................................................. 293/118, 144
See application file for complete search history.

(56) References Cited

U.S. PATENT DOCUMENTS

| | | | |
|---|---|---|---|
| 1,703,856 A | | 2/1929 | Mckeag |
| 2,077,110 A | * | 4/1937 | Johnson ................. B60R 19/16  293/125 |
| 2,840,411 A | * | 6/1958 | Mason .................... B60R 19/16  293/125 |
| 4,068,877 A | * | 1/1978 | Burleson ................ B60R 19/16  280/481 |
| 5,024,476 A | | 6/1991 | Massey |
| 5,478,124 A | * | 12/1995 | Warrington ............. B60D 1/52  280/481 |
| 5,755,470 A | | 5/1998 | Schempp |
| 7,137,456 B2 | | 11/2006 | Moses |
| 7,874,034 B1 | | 1/2011 | Mack et al. |

* cited by examiner

*Primary Examiner* — Joseph D. Pape
(74) *Attorney, Agent, or Firm* — Boudwin Intellectual Property; Daniel Boudwin

(57) ABSTRACT

A hose plow attachment is provided. The device includes a frame removably securable to a vehicle bumper via a mounting bracket, wherein the frame includes an upper cross bar and a lower cross bar. In some embodiments, a platform is disposed between a lower surface of the upper cross bar and an upper surface of the lower cross bar, wherein an exterior surface of the platform comprises a material having a coefficient of friction less than one. In other embodiments, a plurality of rollers is rotatably affixed to a lower surface of the upper cross bar and an upper surface of the lower cross bar, wherein each roller of the plurality of rollers rotates about a longitudinal axis of the plurality of rollers.

18 Claims, 8 Drawing Sheets

HOSE PLOW ATTACHMENT

CROSS REFERENCE TO RELATED APPLICATIONS

This application claims the benefit of U.S. Provisional Application No. 62/939,028 filed on Nov. 22, 2019. The above identified patent application is herein incorporated by reference in its entirety to provide continuity of disclosure.

BACKGROUND OF THE INVENTION

The present invention relates to hose plows. More particularly, the present invention pertains to a hose plow attachment for securement under a vehicle bumper.

During typical firefighting activities, a large amount of equipment is utilized to combat the fire. Typically, one or more fire hoses are actively being used to direct water onto the fire. These fire hoses are typically a large diameter to ensure large volumes of water are transported, however, this also causes the fire hoses to be unwieldy and difficult to move from one location to another. Oftentimes, these fire hoses stretch across a street between a fire hydrant or other water source to the location of the fire. In such situations, it can be difficult to maneuver additional emergency or rescue vehicles within the area.

In order to clear a pathway for emergency responders during an active fire, a large amount of manpower is typically required. Additional firefighters or emergency responders must lift or maneuver the large and heavy fire hoses to create a space in the vicinity for the emergency vehicle. This can divert manpower and effort away from combatting the fire, which could in turn increase the amount time before the fire is fully under control. Failure to properly control a fire in a timely manner can increase damage to the building or to surrounding structures. Alternatively, failure to move fire hoses posing a barrier to vehicles can force additional responders to walk to the area, often carrying additional equipment. This can further delay emergency response. Therefore, a device that can easily move heavy fire hoses across a given roadway to allow vehicles to reach the location of an emergency is desired.

In light of the devices disclosed in the known art, it is submitted that the present invention substantially diverges in design elements from the known art and consequently it is clear that there is a need in the art for an improvement to existing methods of moving fire hoses. In this regard, the instant invention substantially fulfills these needs.

SUMMARY OF THE INVENTION

In view of the foregoing disadvantages inherent in the known types of hose plows now present in the known art, the present invention provides a hose plow attachment wherein the same can be utilized for providing convenience for the user when maneuvering fire engines or other vehicles at the scene of a fire while pushing active fire hoses out of the vehicle's path.

The present system comprises a frame removably securable to a vehicle bumper via a mounting bracket, wherein the frame comprises an upper cross bar and a lower cross bar. In one embodiment, a plurality of rollers is rotatably affixed to a lower surface of the upper cross bar and an rapper surface of the lower cross bar, wherein the plurality of rollers rotate about a longitudinal axis of each of the plurality of rollers. In another embodiment, a platform is affixed between the upper surface and the lower surface of the lower and upper cross bars, respectively. In such embodiments, an exterior surface of the platform comprises a material having a coefficient of friction less than one.

In some embodiments, each roller of the plurality of rollers comprises a central channel configured to receive a vertical connection rod therethrough, wherein the vertical connection rod extends between the upper cross bar and the lower cross bar. In another embodiment, each roller of the plurality of rollers tapers radially inwardly from each of an upper end and a lower end thereof. In other embodiments, an actuator is configured to selectively move the frame between an elevated position and a lowered position. In yet another embodiment, the actuator is operably connected to a hinge disposed on the mounting bracket, wherein the mounting bracket is configured to fold about the hinge such that the frame is substantially parallel to a lower side of a vehicle when in the elevated position. In some embodiments, the actuator is operably connected to at least one pneumatic piston affixed to the mounting bracket, wherein the pneumatic piston is configured to selectively raise or lower the frame along a longitudinal axis of the pneumatic piston. In another embodiment, the pneumatic piston is configured to selectively rase or lower the frame to various heights at set intervals. In other embodiments, the actuator is operably connected to a control disposed within a cab of a vehicle. In yet another embodiment, an exterior surface of each roller of the plurality of rollers comprises a material having a coefficient of friction less than one. In some embodiments, the frame is disposed at an acute angle relative to the vehicle bumper when the frame is secured thereto. In another embodiment, the platform further comprises a depression along a central longitudinal axis of the platform. In other embodiments, the depression is defined by a gradual taper such that the depression forms and arcuate shape.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1A:
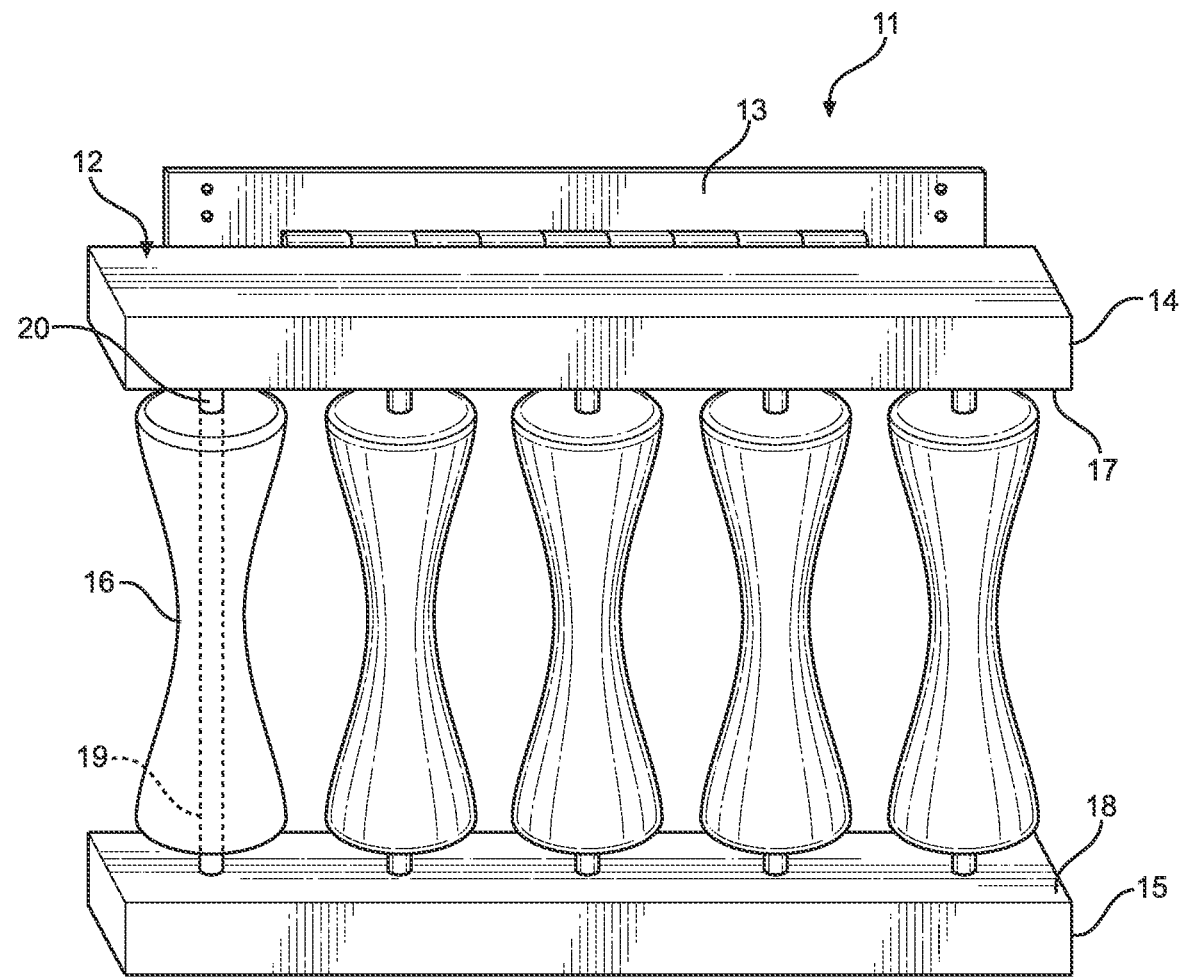
FIG. 1A shows a perspective view of an embodiment of the hose plow attachment.

Reference is made herein to the attached drawings. Like reference numerals are used throughout the drawings to depict like or similar elements of the hose plow attachment.

The figures are intended for representative purposes only and should not be considered to be limiting in any respect.

Figure 1B:
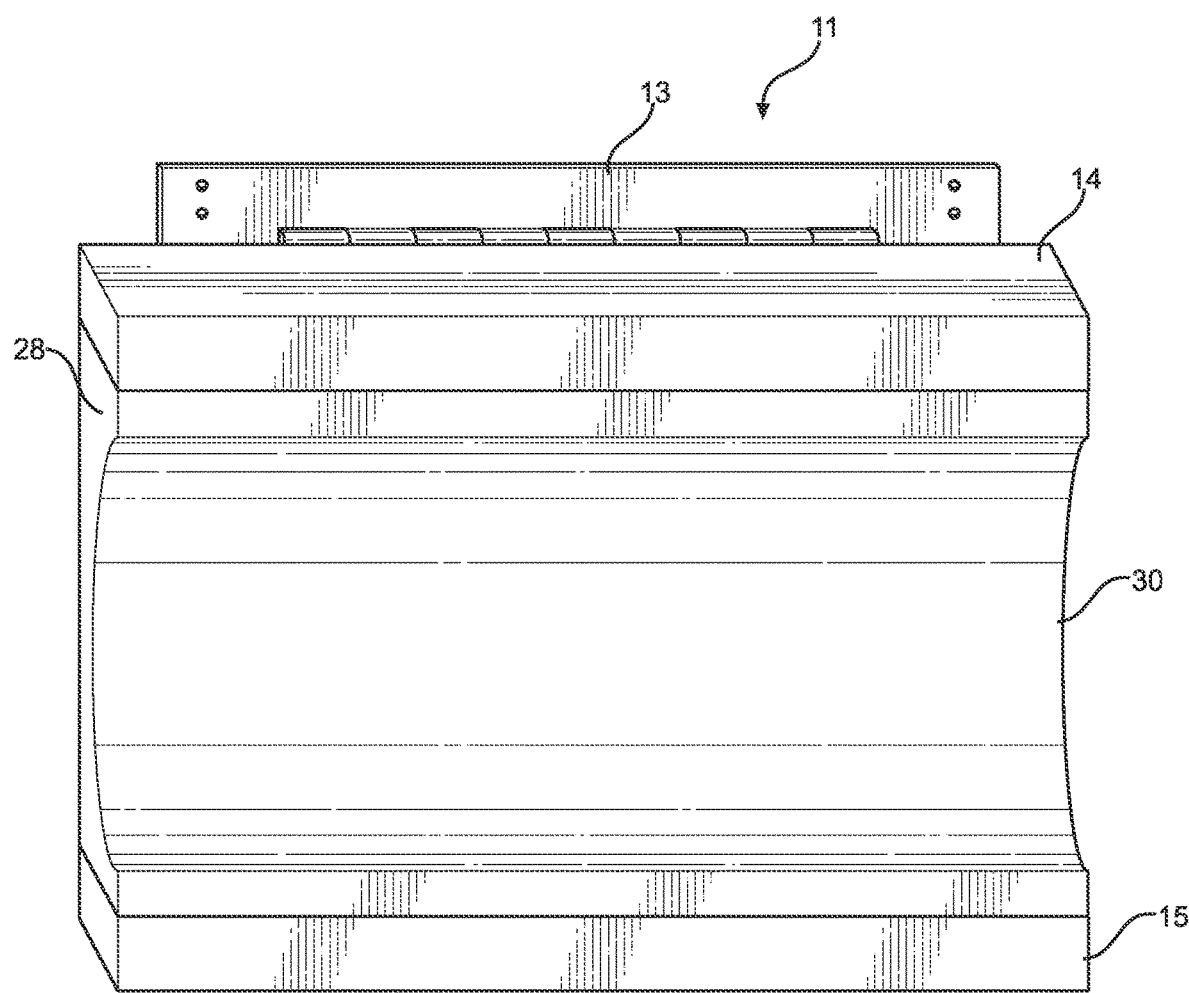
FIG. 1B shows a perspective view of an alternate embodiment of the hose plow attachment.
Figure 1C:
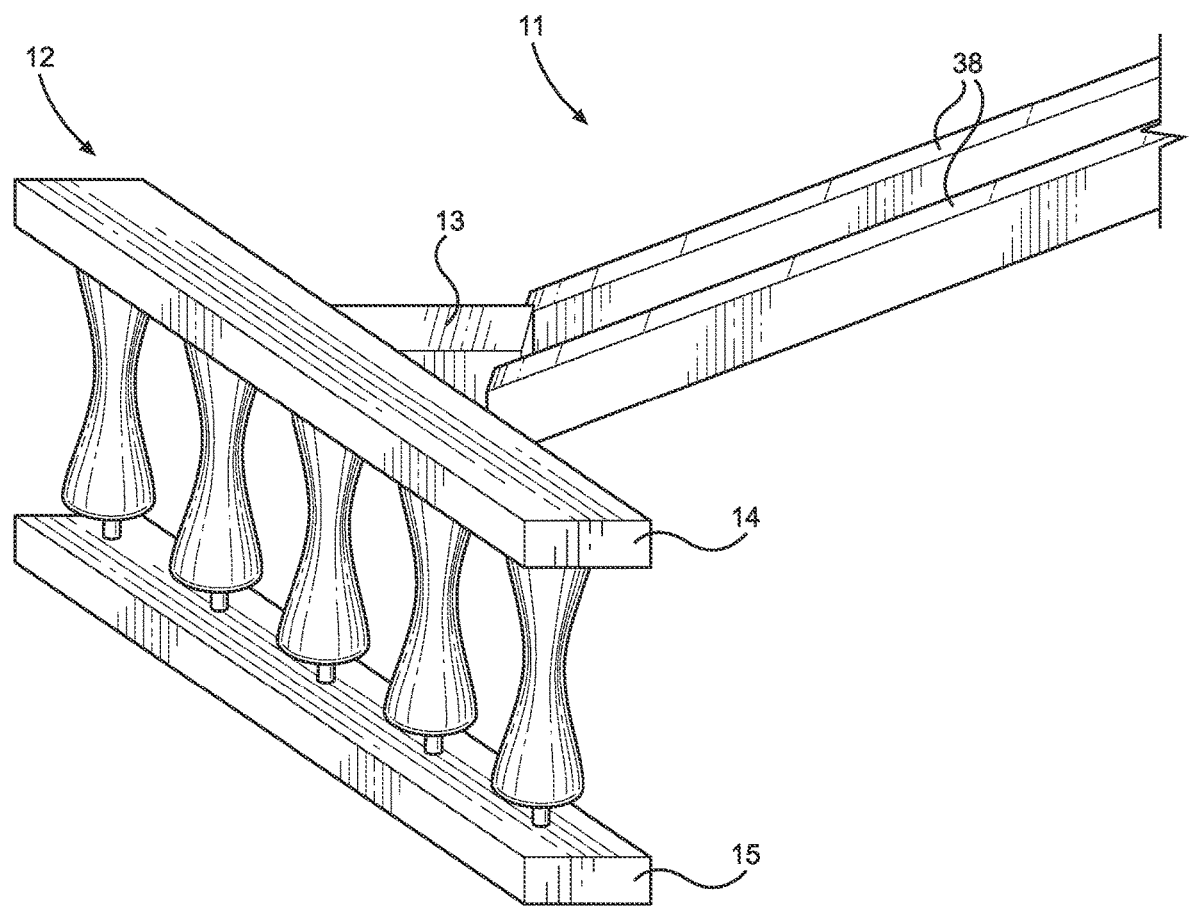
FIG. 1C shows a perspective view of an alternate embodiment of the hose plow attachment.

Referring now to FIGS. 1A, 1B, and 1C, there are shown perspective views of various embodiments of the hose plow attachment. The hose plow attachment 11 comprises a frame 12 having an upper cross bar 14 and a lower cross bar 15. The frame 12 is removably securable to a vehicle via a mounting bracket 13 affixed to the frame 12. In the shown embodiment, the mounting bracket 13 is affixed to the upper cross bar 14 and comprises a planar construction, however other mounting brackets 13, such as clamp-style brackets, are contemplated to removably secure to various components of a vehicle's underside. In the shown embodiments, the mounting bracket 13 is contemplated to include various apertures for securing fasteners therethrough. The mounting bracket 13 can extend along an entire length of the upper cross bar 14 for additional stability to the frame 12 when secured to the vehicle.

Figure 4:
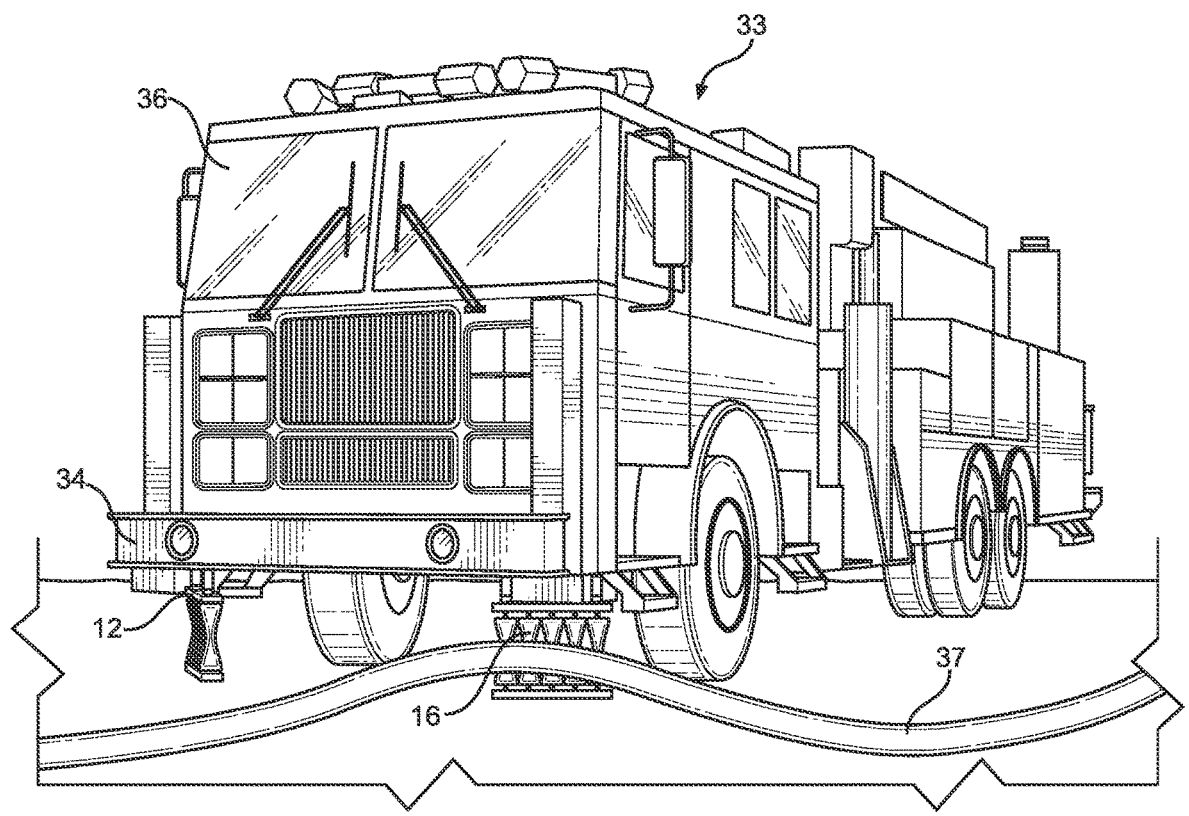
FIG. 4 shows a perspective view of an embodiment of the hose plow attachment affixed to a vehicle.

In the illustrated embodiment of FIG. 1A, a plurality of rollers 16 are rotatably affixed between the upper and lower cross bars 14, 15 such that the plurality of rollers 16 rotate about a longitudinal axis thereof. In some embodiments, an exterior surface of each roller of the plurality of rollers 16 comprises a low-friction material having a coefficient of friction less than one. In this manner, damage to a fire hose sliding along the plurality of rollers 16 is minimized. In the shown embodiment, the plurality of rollers 16 are colinearly arranged along the frame 12, such that a fire hose (as shown in FIG. 4, 37) is guided along the frame 12 to remove the fire hose from the path of the vehicle. In the illustrated embodiment, the plurality of rollers 16 are affixed to the frame 12 via a vertical connection rod 20 extending between a lower surface 17 of the upper cross bar 14 and an upper surface 18 of the lower cross bar 15. The vertical connection rod 20 extends through a central channel 19 extending through each roller of the plurality of rollers 16.

In the shown embodiment of FIG. 1B, a platform 28 is affixed between the upper and lower cross bars 14, 15. An exterior surface of the platform 28 comprises a low-friction material having a coefficient of friction less than one. In this manner, a fire hose or other object readily slides and moves over the exterior surface of the platform 28 such that damage to the fire hose is minimized. In the shown embodiment, the platform 28 extends along an entire length of the upper and lower cross bars 14, 15. A depression 30 is defined within the platform 28, wherein the depression 30 is contemplated to conform to the dimensions of a fire hose. In the shown embodiment, the depression 30 is defined by a gradual taper from opposing ends of the platform 28, such that the depression 30 forms an arcuate cross-section. In some embodiments, each opposing lateral side of the platform 28 comprises a rounded forward edge, such that contact between the fire hose and the lateral sides of the platform 28 along the depression 30 does not cause damage to the fire hose. In the shown embodiment, the depression 30 extends along an entirety of the platform 28 along a central longitudinal axis thereof, such that the depression 30 is oriented parallel to the upper and lower cross bars 14, 15 and substantially parallel to a ground surface over which the vehicle is travelling. In this manner, a fire hose obstructing the path of the vehicle can be captured by the depression 30 and guided out of the pathway of the vehicle.

In the illustrated embodiment of FIG. 1C, the mounting bracket 13 is affixed to a rear side of each of the upper and lower cross bars 14, 15. A front side of the mounting bracket 13 comprises an angled face, such that the frame 12 is positioned at a desired angle to displace fire hoses disposed across a street or other surface. In the illustrated embodiment, a pair of arms 38 are pivotally affixed to the mounting bracket 13 and an underside of the vehicle, such that the pair of arms 38 are configured to selectively raise and lower the frame 12 while maintaining the frame 12 in a substantially vertical position. In this manner, the user can deploy the frame 12 at a desired height to accommodate various road surfaces and topography, such that the frame 12 does not drag across the ground surface as the vehicle is driven.

Figure 2:
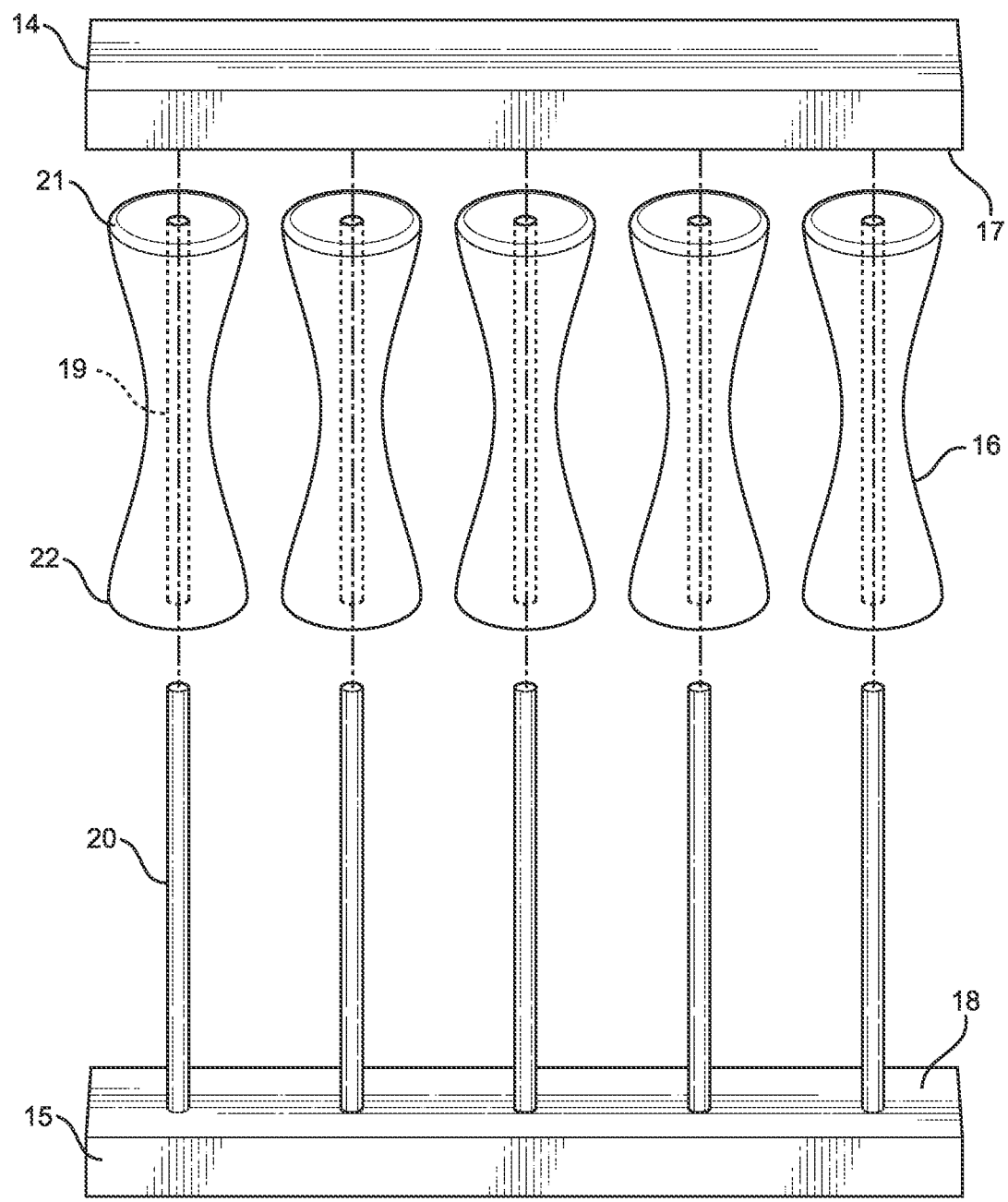
FIG. 2 shows an exploded view of an embodiment of the hose plow attachment.

Referring now to FIG. 2, there is shown an exploded view of an embodiment of the hose plow attachment. In the shown embodiment, each roller of the plurality of rollers 16 are rotatably affixed to the frame via a vertical connection rod 20 extending between the upper surface 18 and the lower surface 17 of the lower cross bar 15 and the upper cross bar 14, respectively. The plurality of rollers 16 each include a central channel 19 configured to receive the vertical connection rod 20 therethrough to allow each roller to rotate about the longitudinal axis of the roller. In the shown embodiment, each roller of the plurality of rollers 16 tapers radially inwardly from each of an upper end 21 and a lower end 22 thereof. In this manner, the plurality of rollers 16 are dimensioned to conform to a substantially cylindrical object, such as a fire hose. In some embodiments, the vertical connection rods 20 include stoppers thereon to retain the plurality of rollers 16 in a desired position along the vertical connection rod 20. In some embodiments, the upper and lower cross bars 14, 15 are removably securable to the vertical connection rods 20, such that the user can readily disassembly the frame for transport or storage.

Figure 3A:
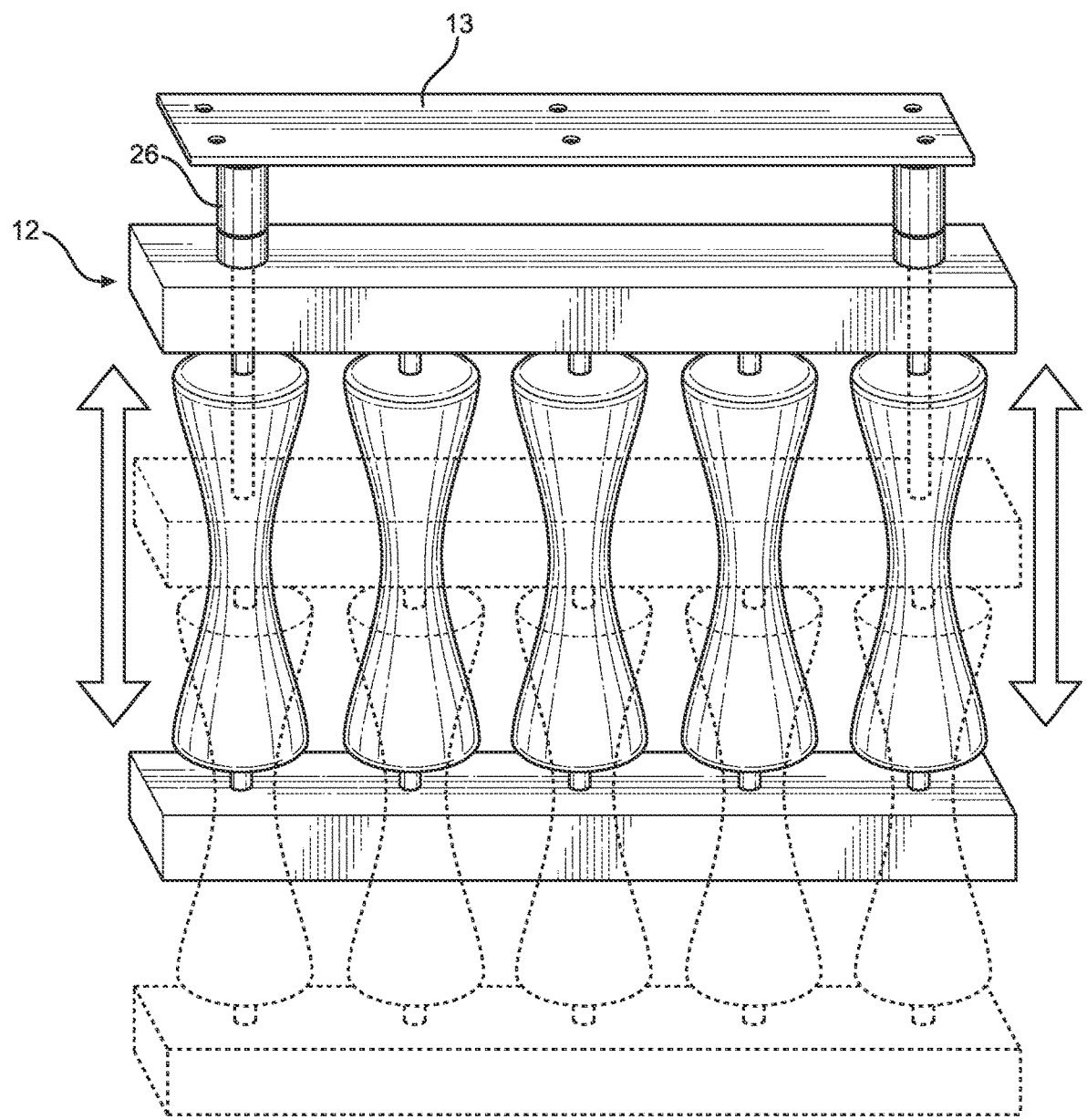
FIG. 3A shows a perspective view of the mounting bracket of an embodiment of the hose plow attachment.
Figure 3B:
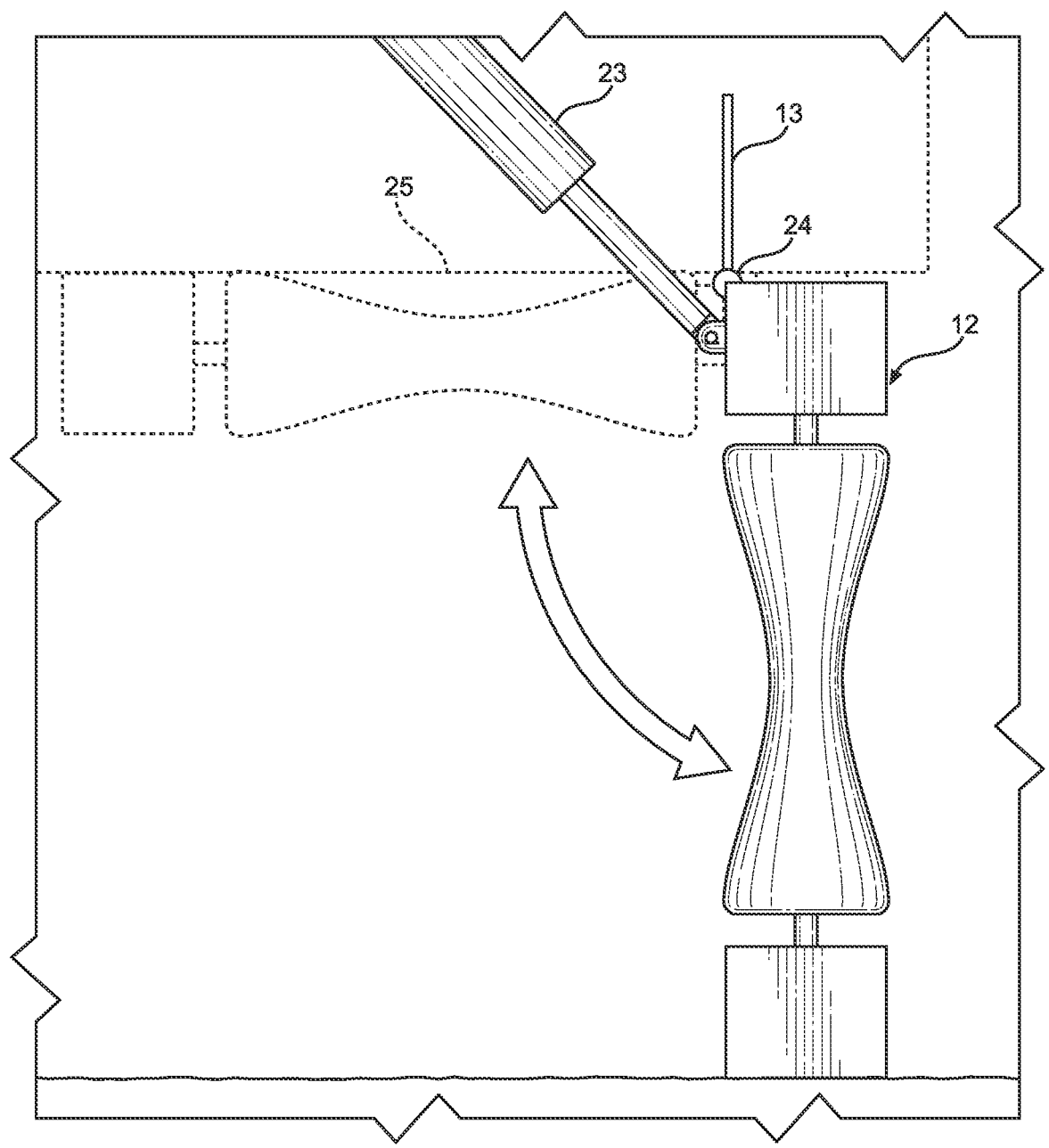
FIG. 3B shows a side view of the mounting bracket of an alternate embodiment of the hose plow attachment.
Figure 3C:
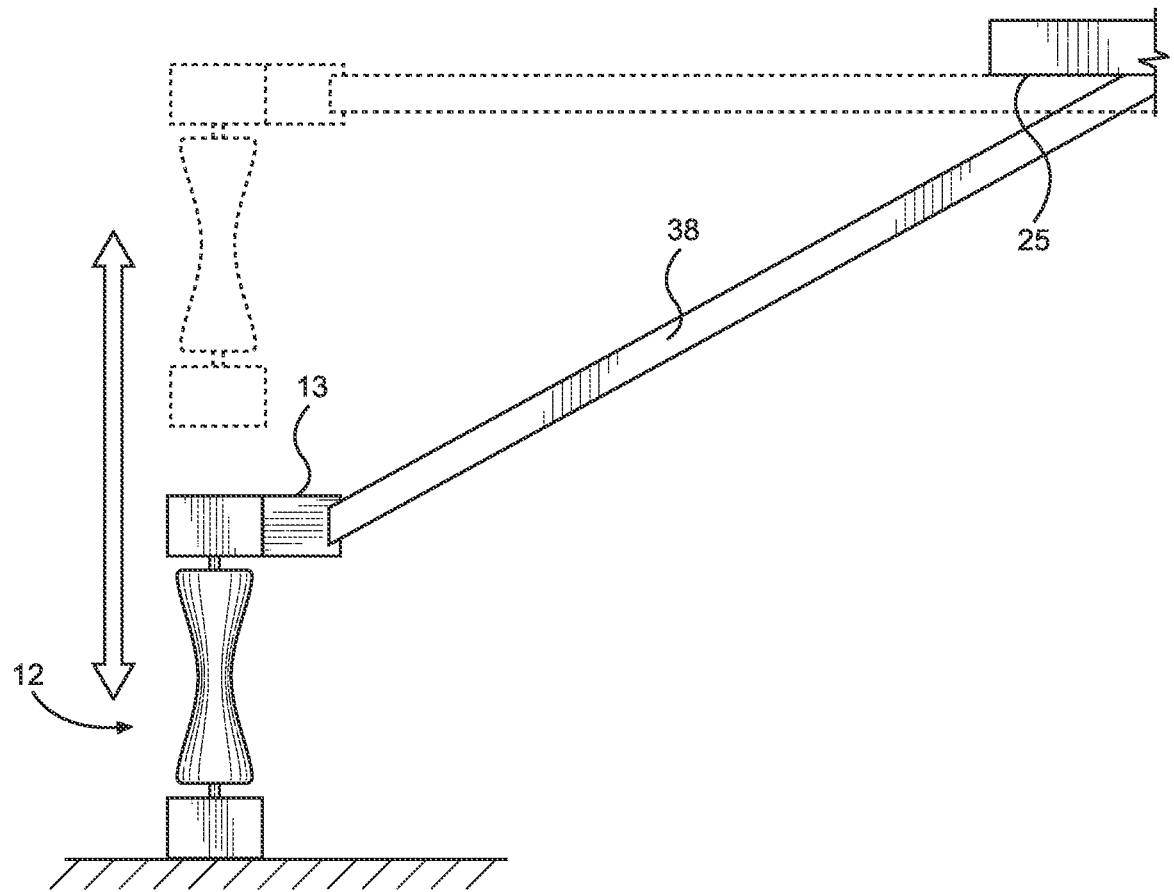
FIG. 3C shows a side view of the mounting arms of an alternate embodiment of the hose plow attachment.

Referring now to FIGS. 3A, 3B and 3C, there is shown a perspective view of the mounting bracket of an embodiment of the hose plow attachment, a side view of the mounting bracket of an embodiment of the hose plow attachment, and a side view of the mounting arms of an alternate embodiment of the hose plow attachment, respectively. In the illustrated embodiments, the frame 12 is selectively movable between an elevated position and a lowered position via an actuator. In the shown embodiment of FIG. 3A, the actuator is operably connected to a pair of pneumatic pistons 26 affixed between the mounting bracket 13 and the upper cross bar of the frame 12, wherein the pneumatic pistons 26 are configured to selectively extend and retract along a longitudinal axis thereof. In this manner, when the pneumatic pistons 26 extend, the frame 12 is moved to the lowered position for use. When the frame 12 is affixed to a vehicle, the user can elevate the frame 12 to avoid the frame coming in contact with a road surface or other debris during travel, and lower the frame 12 to engage the plurality of rollers with a fire hose that the user desires to divert from the roadway. In some embodiments, the pneumatic piston 26 is configured to selectively move between various degrees of extension along set intervals. In this manner, the user can select a desired height of the frame 12 between fully raised and fully elevated.

In the shown embodiment of FIG. 3B, the frame 12 is affixed to the vehicle via the mounting bracket 13. In this embodiment, an actuator rod 23 is affixed to the mounting bracket 13 and is configured to selectively move the frame 12 between an elevated position and a lowered position about a hinge 24 disposed on the mounting bracket 13. In the shown embodiment, the frame 12 is disposed substantially parallel to an underside 25 of the vehicle when in the elevated position. In this manner, the frame 12 is disposed away from the ground surface to minimize damage to the frame 12 during travel. When the user desires to lower the frame, the actuator rod 23 can be activated to fold the frame 12 about the hinge 24 to a position substantially perpendicular to the underside 25 of the vehicle.

In the illustrated embodiment of FIG. 3C, the mounting bracket 13 is affixed to a rear side of the frame 12, and a pair of arms 38 are pivotally affixed to each of the mounting bracket 13 and the underside 25 of the vehicle. In this manner, the frame 12 can be selectively moved between a raised position substantially parallel to the underside 25 of the vehicle and a lowered position to interface with a fire hose disposed across a roadway. In the shown embodiment, the frame 12 remains in a substantially vertical position in each of the raised and lowered positions, as well as any positions therebetween. In this manner, the user can incrementally raise the frame 12 to accommodate road topography and prevent the frame 12 from contacting the road surface.

Referring now to FIG. 4, there is shown a perspective view of an embodiment of the hose plow attachment affixed to a vehicle. In one use, the frame 12 is removably secured to an underside of a bumper 34 of the desired vehicle 33, such as a fire engine or other emergency response vehicle. The frame 12 is disposed under the vehicle 33 at an acute angle, such that the frame 12 diverts a fire hose 37 in contact with the plurality of rollers 16. In some embodiments, the frame 12 can be selectively raised or lowered as previously described. In such embodiments, the frame 12 can be maintained in the elevated position until the vehicle 33 comes across an obstacle in the roadway, at which point the user can actuate the actuator within a cab 36 of the vehicle 33 to lower the frame 12 to divert the obstacle from the path of the vehicle 33. Once the fire hose 37 contacts the plurality of rollers 16, the hose 37 is shifted out of the path of the vehicle 33. In the shown embodiment, multiple frames 12 are affixed to the vehicle bumper 34 at opposing sides of the vehicle 33, such that the frames 12 form a wedge. In this manner, the vehicle 33 can travel through a roadway blocked by a fire hose 37 without damaging the fire hose 37.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A hose plow attachment, comprising:
   a frame removably securable to a vehicle bumper via a mounting bracket;
   wherein the frame comprises an upper cross bar and a lower cross bar;
   a plurality of rollers rotatably affixed to a lower surface of the upper cross bar and an upper surface of the lower cross bar;
   wherein each roller of the plurality of rollers rotate about a longitudinal axis of each of the plurality of rollers; and
   an actuator configured to selectively move the frame between an elevated position and a lowered position.

2. The hose plow attachment of claim 1, wherein each of the plurality of rollers comprises a central channel configured to receive a vertical connection rod therethrough, wherein the vertical connection rod extends between the upper cross bar and the lower cross bar.

3. The hose plow attachment of claim 1, wherein each roller of the plurality of rollers tapers radially inwardly from each of an upper end and a lower end thereof.

4. The hose plow attachment of claim 1, wherein the actuator is operably connected to a hinge disposed on the mounting bracket, wherein the mounting bracket is configured to fold about the hinge such that the frame is substantially parallel to a lower side of a vehicle when in the elevated position.

5. The hose plow attachment of claim 1, wherein the actuator is operably coupled to at least one pneumatic piston affixed to the mounting bracket, wherein the pneumatic piston is configured to selectively raise or lower the frame along a longitudinal axis of the pneumatic piston.

6. The hose plow attachment of claim 5, wherein the pneumatic piston is configured to selectively raise or lower the frame to various heights at set intervals.

7. The hose plow attachment of claim 1, wherein the actuator is operably connected to a control disposed within a cab of a vehicle.

8. The hose plow attachment of claim 1, wherein an exterior surface of each roller of the plurality of rollers comprises a material having a coefficient of friction less than one.

9. A hose plow attachment, comprising:
   a frame removably securable to a vehicle bumper via a mounting bracket;
   wherein the frame comprises an upper cross bar and a lower cross bar;
   a platform affixed to a lower surface of the upper cross bar and an upper surface of the lower cross bar;
   wherein an exterior surface of the platform comprises a material having a coefficient of friction less than one.

10. The hose plow attachment of claim 9, further comprising an actuator configured to selectively move the frame between an elevated position and a lowered position.

11. The hose plow attachment of claim 10, wherein the actuator is operably connected to a hinge disposed on the mounting bracket, wherein the mounting bracket is configured to fold about the hinge such that the frame is substantially parallel to a lower side of a vehicle when in the elevated position.

12. The hose plow attachment of claim 10, wherein the actuator is operably coupled to at least one pneumatic piston affixed to the mounting bracket, wherein the pneumatic piston is configured to selectively raise or lower the frame along a longitudinal axis of the pneumatic piston.

13. The hose plow attachment of claim 12, wherein the pneumatic piston is configured to selectively raise or lower the frame to various heights at set intervals.

14. The hose plow attachment of claim 10, wherein the actuator is operably connected to a control disposed within a cab of a vehicle.

15. The hose plow attachment of claim 9, wherein the platform further comprises a depression along a central longitudinal axis of the platform.

16. The hose plow attachment of claim 15, wherein the depression is defined by a gradual taper such that the depression forms an arcuate shape.

17. The hose plow attachment of claim 9, wherein the frame is disposed at an acute angle relative to the vehicle bumper when the frame is secured thereto.

18. A hose plow attachment, comprising:
- a frame removably securable to a vehicle bumper via a mounting bracket;
- wherein the frame comprises an upper cross bar and a lower cross bar;
- a plurality of rollers rotatably affixed to a lower surface of the upper cross bar and an upper surface of the lower cross bar;
- wherein each roller of the plurality of rollers rotate about a longitudinal axis of each of the plurality of rollers; and
- wherein the frame is disposed at an acute angle relative to the vehicle bumper when the frame is secured thereto.

* * * * *